US008607211B2

(12) United States Patent
Blainey et al.

(10) Patent No.: US 8,607,211 B2
(45) Date of Patent: *Dec. 10, 2013

(54) LINKING CODE FOR AN ENHANCED APPLICATION BINARY INTERFACE (ABI) WITH DECODE TIME INSTRUCTION OPTIMIZATION

(75) Inventors: Robert J. Blainey, Newmarket (CA); Michael K. Gschwind, Chappaqua, NY (US); James L. McInnes, Toronto (CA); Michael R. Meissner, Ayer, MA (US); Steven J. Munroe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/458,108

(22) Filed: Apr. 27, 2012

(65) Prior Publication Data

US 2013/0086338 A1  Apr. 4, 2013

Related U.S. Application Data

(63) Continuation of application No. 13/251,793, filed on Oct. 3, 2011.

(51) Int. Cl.
*G06F 9/44* (2006.01)
(52) U.S. Cl.
USPC ............ 717/162; 717/163; 717/164; 717/165
(58) Field of Classification Search
USPC .......................... 717/154, 162, 163, 164, 165
See application file for complete search history.

(56) References Cited

U.S. PATENT DOCUMENTS

| 4,763,255 | A | | 8/1988 | Hopkins et al. |
| 5,095,526 | A | | 3/1992 | Baum |
| 5,303,358 | A | | 4/1994 | Baum |
| 5,339,431 | A | * | 8/1994 | Rupp et al. ..................... 717/162 |

(Continued)

FOREIGN PATENT DOCUMENTS

| CN | 1838088 A | 9/2006 |
| CN | 101520737 A | 9/2009 |

(Continued)

OTHER PUBLICATIONS

Muth et al., "A Link-Time Optimizer for the DEC Alpha", 1998.*

(Continued)

*Primary Examiner* — Phillip H Nguyen
(74) *Attorney, Agent, or Firm* — Cantor Colburn LLP; John Campbell

(57) ABSTRACT

A code sequence made up multiple instructions and specifying an offset from a base address is identified in an object file. The offset from the base address corresponds to an offset location in a memory configured for storing an address of a variable or data. The identified code sequence is configured to perform a memory reference function or a memory address computation function. It is determined that the offset location is within a specified distance of the base address and that a replacement of the identified code sequence with a replacement code sequence will not alter program semantics. The identified code sequence in the object file is replaced with the replacement code sequence that includes a no-operation (NOP) instruction or having fewer instructions than the identified code sequence. Linked executable code is generated based on the object file and the linked executable code is emitted.

7 Claims, 11 Drawing Sheets

(56) References Cited

U.S. PATENT DOCUMENTS

| | | |
|---|---|---|
| 5,469,572 A | 11/1995 | Taylor |
| 5,737,629 A | 4/1998 | Zuraski, Jr. et al. |
| 5,761,514 A | 6/1998 | Aizikowitz et al. |
| 5,797,014 A | 8/1998 | Gheith |
| 6,059,840 A | 5/2000 | Click, Jr. |
| 6,071,317 A * | 6/2000 | Nagel .......................... 717/128 |
| 6,094,719 A | 7/2000 | Panwar |
| 6,189,088 B1 | 2/2001 | Gschwind |
| 6,243,864 B1 | 6/2001 | Odani et al. |
| 6,308,258 B1 | 10/2001 | Kubota et al. |
| 6,314,511 B2 | 11/2001 | Levy et al. |
| 6,408,433 B1 | 6/2002 | Click, Jr. et al. |
| 6,449,710 B1 | 9/2002 | Isaman |
| 6,457,174 B1 | 9/2002 | Kuroda et al. |
| 6,687,806 B1 | 2/2004 | McGrath |
| 6,687,899 B1 * | 2/2004 | Shann .......................... 717/162 |
| 6,704,928 B1 * | 3/2004 | Shann .......................... 717/162 |
| 6,718,546 B1 | 4/2004 | Johnson |
| 6,748,519 B1 | 6/2004 | Moore |
| 6,802,060 B1 * | 10/2004 | Shann .......................... 717/162 |
| 6,859,932 B1 * | 2/2005 | Shann .......................... 719/331 |
| 6,901,584 B2 * | 5/2005 | Shann .......................... 717/140 |
| 6,950,926 B1 | 9/2005 | Menezes |
| 7,131,017 B2 | 10/2006 | Schmit et al. |
| 7,168,069 B1 * | 1/2007 | Sigmund ...................... 717/140 |
| 7,228,403 B2 | 6/2007 | Leber et al. |
| 7,299,462 B2 | 11/2007 | Shann et al. |
| 7,310,799 B2 | 12/2007 | Eisenberg et al. |
| 7,412,710 B2 | 8/2008 | Oliva |
| 7,487,338 B2 | 2/2009 | Matsuo |
| 7,500,126 B2 | 3/2009 | Terechko et al. |
| 7,519,951 B2 | 4/2009 | Deedwaniya et al. |
| 7,543,284 B2 | 6/2009 | Bolton et al. |
| 7,565,665 B2 | 7/2009 | Forin et al. |
| 7,669,038 B2 | 2/2010 | Burky et al. |
| 7,676,653 B2 | 3/2010 | May |
| 7,739,442 B2 | 6/2010 | Gonion |
| 7,739,482 B2 | 6/2010 | Nguyen et al. |
| 7,769,885 B1 | 8/2010 | Kompella |
| 7,805,536 B1 | 9/2010 | Kompella et al. |
| 7,975,975 B2 | 7/2011 | Lee |
| 8,180,964 B1 | 5/2012 | Koh et al. |
| 2002/0073398 A1 | 6/2002 | Tinker |
| 2002/0124155 A1 | 9/2002 | Sami et al. |
| 2002/0138824 A1 * | 9/2002 | Shann .......................... 717/140 |
| 2003/0009750 A1 | 1/2003 | Hundt et al. |
| 2003/0079210 A1 | 4/2003 | Markstein et al. |
| 2003/0154419 A1 | 8/2003 | Zang et al. |
| 2004/0049667 A1 * | 3/2004 | McCormick et al. ......... 712/233 |
| 2004/0064680 A1 | 4/2004 | Kadambi et al. |
| 2005/0251662 A1 | 11/2005 | Samra |
| 2006/0080682 A1 | 4/2006 | Anwar et al. |
| 2006/0174089 A1 | 8/2006 | Altman et al. |
| 2006/0190710 A1 | 8/2006 | Rychlik |
| 2007/0226717 A1 | 9/2007 | Shtilman et al. |
| 2007/0277162 A1 | 11/2007 | Tanaka et al. |
| 2008/0016324 A1 | 1/2008 | Burky et al. |
| 2008/0022044 A1 | 1/2008 | Nunamaker et al. |
| 2008/0133893 A1 | 6/2008 | Glew |
| 2008/0148022 A1 | 6/2008 | Piry et al. |
| 2009/0019257 A1 | 1/2009 | Shen et al. |
| 2009/0019263 A1 | 1/2009 | Shen et al. |
| 2009/0055631 A1 | 2/2009 | Burky et al. |
| 2009/0198986 A1 | 8/2009 | Kissell |
| 2010/0095286 A1 | 4/2010 | Kaplan |
| 2010/0312991 A1 | 12/2010 | Norden et al. |
| 2010/0332803 A1 | 12/2010 | Yoshida et al. |
| 2011/0087865 A1 | 4/2011 | Barrick et al. |
| 2011/0099333 A1 | 4/2011 | Sprangle et al. |
| 2011/0138372 A1 | 6/2011 | Damron |

FOREIGN PATENT DOCUMENTS

| | | |
|---|---|---|
| CN | 101630269 A | 1/2010 |
| JP | 2002182926 A | 6/2002 |
| JP | 2007304663 | 11/2007 |

OTHER PUBLICATIONS

Adve et al., "Changing Interaction of Compiler and Architecture", 1997.*
PCT International Search Report and Written Opinion, International Appl. No. PCT/IB2012/055255, International Filing date: Oct. 1, 2012, Date of Mailing: Feb. 7, 2013, 7 pages.
PCT International Search Report and Written Opinion, International Appl. No. PCT/IB2012/055252, International Filing Date: Oct. 1, 2012, Date of Mailing: Feb. 7, 2013, 7 pages.
PCT International Search Report and Written Opinion, International Appl. No. PCT/IB2012/054809, International Filing date: Sep. 14, 2012, Date of Mailing: Feb. 28, 2013, 10 pages.
Bednarski et al.; "Energy-Optimal Integrated VLIW Code Generation"; Proceedings of 11th Workshop on Compliers for Parallel Computers; 2004; pp. 1-14.
Butts et al.; "Use-Based Register Caching with Decoupled Indexing"; Proceedings of the 31st Annual Symposium on Computer Architecture; Jun. 2004; pp. 1-12.
Cruz et al.; "Multiple-Banked Register File Architecture"; Proceedings of the 27th International Symposium on Computer Architecture; Jun. 2000; pp. 316-325.
Ebcioglu et al.; "Optimizations and Oracle Parallelism with Dynamic Translation"; Proceeding MICRO 32 Proceedings of the 32nd Annual ACM/IEEE International Symposium on Microarchitecture; 1999; pp. 1-12.
Franklin et al.; "Register Traffic Analysis for Streamlining Inter-Operation Communication in Fine-Grain Paralellel Processors" IEEE; SIGMICRO Newsletter Dec. 23,; pp. 236-245, 1999.
Gschwind et al.; "Dynamic and Transparent Binary Translation"; IEEE Computer; Mar. 2000; pp. 54-59.
Hampton; "Explosing Datapath Elements to Reduce Microprocessor Energy Consumption"; MIT Thesis; Jun. 2001; pp. 1-80.
IBM Power ISA Version 2.06; Revision B; Jul. 23, 2010; pp. cover-1313.
Lozano et al. "Exploiting Short-Livd Variables in Superscalar Processors"; 1995 Proceedings of MIRCO-28; pp. 292-302.
Martin et al.; "Exploiting Dead Value Information"; IEEE Proceedings of Micro-30; Dec. 1997; pp. 1-11.
Nagarakatte, SG et al. "Register Allocation and Optimal Spill Code Scheduling in Software Pipelined Loops Using 01-Integer Linear Programming Formulation"; Conference on Compiler Construction CC '079—pp. 126-140—2007.
Oehmke, DW "Virtualizing Register Context"; Dissertation, University of Michigan; Doctor of Philosophy; 2005.
Ponomarev et al.; "Isolating Short-Lived Operands for Energy Reduction"; IEEE Transactions on Computers; vol. 53, No. 6, Jun. 2004; pp. 697-709.
Power ISA Version 2.06 Revision B—Published Jul. 23, 2010—pp. 1-1,341.
Probst, M. et al.; "Register Liveness Analysis for Optimizing Dynamic Binary Translation"; Proceedings of the 9th Working Conference on Reverse Engineering (WCRE '02) pp. 35-44; 2002.
Shioya et al.; "Register Cache System not for Latency Reduction Purpose"; 2010 43rd Annual IEEE ACM International Symposium on Microarchitecture; Dec. 2010; pp. 301-312.
Shrivastava et al.; "Compilation Framework for Code Size Reduction Using Reduced Bit-Width ISAs"; ACM Transactions on Design Automation of Electornic Systems; vol. 11; Issue 1, Jan. 2006.
Tan et al.; "Register Caching as a Way of Mitigating Intercluster Communication Penalities in Clustered Microarchitectures:; 2008 International Conference on Computing and Electrical Engineering":; Dec. 2008 pp. 194-198.
U.S. Appl. No. 13/251,426; Entitled: "Prefix Computer Instruction for Compatibly Extending Instruction Functionality"; Filed: Oct. 3, 2011.

(56) References Cited

OTHER PUBLICATIONS

U.S. Appl. No. 13/251,458; Entitled: "Computer Instructions for Activating and Deactivating Operands"; Filed Oct. 3, 2011.
U.S. Appl. No. 13/251,441; Entitled: "Tracking Operand Liveliness Information in a Computer System and Performing Function Based on the Liveliness Information", Filed Oct. 3, 2011.
Valentina Salapura et al.; "Design and Implementation of the Blue/Gene/P Snoop Filter" ; IEEE; 2008—pp. 1-10.
Vo et al.; "Enhance up to 40% Performance of SH-4A Processor by Using Prefix Instruction"; Solid-State and Integrated Circuit Technology; 2010 10th IEEE International Conference on Circuit Technology; pp. 360-362.
Xiao, R. "Study on Interference Graph of Register Allocation Based on Web"; Computer Engineering; vol. 36; No. 11; pp. 70-72; Jun. 2010.
z/Architecture: "Principles of Operation"; Sixth Edition, Apr. 2007, Publication No. SA22-7832-05, copyright IBM Corp. 1990-2007, p. 1-1218.
Zyuban et al.; "Inherently Lower-Power High-Performance Superscalar Architectures"; IEEE Transactions on Computers; vol. 50, No. 3; Mar. 2001; pp. 268-285.
Adve et al., "Changing Interaction of Compiler and Architecture", 1997, 8 pages.
Muth et al., "A Link-Time Optimizer for the DEC Alpha", 1998, 29 pages.
Muth, "Alto: A Platform for Object Code Modification," A Disertation Submitted to the Faculty of Department of Computer Science, Title, Abstract and Chapter 3, 1999, 27 pages.
Goodwin, "Interprocedural Dataflow Analysis in an Executable Optimizer" Digitial Equipment Corporation, ACM SIGPLAN 97 Conference on Programming Language Design and Implementation, Jun. 1997, 12 pages.
Li, "Scratch-pad Memory Management for Static Data Aggregates," Computer Science and Engineering, Title, Abstract and Chapters 2 and 3, Aug. 6, 2007, 27 pages.
Lo et al., "Software-Directed Register Deallocation for Simultaneous Multithreaded Processors," IEEE Transactions on Parallel and Distributed Systems, vol. 10, No. 9, Sep. 1999, 12 pages.
U.S. Appl. No. 13/664,595; Non-Final Office Action; filed Oct. 31, 2012; Date Mailed: Jun. 5, 2013, pp. 1-15.
U.S. Appl. No. 13/251,803; Non-Final Office Action; filed Oct. 3, 2011; Date Mailed: Jun. 5, 2013, pp. 1-24.
Niranjan Hasabnis, "Infrastructure for Architecture—Independent Binary Analysis and Transformation," 2011, 52 pages.
William A. Wuff, "Compilers and Computer Architecture," 1981, 7 pages.

\* cited by examiner

LINKING CODE FOR AN ENHANCED APPLICATION BINARY INTERFACE (ABI) WITH DECODE TIME INSTRUCTION OPTIMIZATION

CROSS-REFERENCE TO RELATED APPLICATION

This application is a continuation of U.S. patent application Ser. No. 13/251,793, filed Oct. 3, 2011, the content of which is hereby incorporated by reference herein in its entirety.

BACKGROUND

The present invention relates to computer systems, and more specifically, to linking compiled code for an enhanced application binary interface (ABI) with decode time instruction optimization.

In computer software, an application binary interface (ABI) describes the low-level interface between an application program and the operating system or between the application program and another application. The ABI cover details such as data type, size, and alignment; the calling conventions which controls how function arguments are passed and how return values are retrieved; the system call numbers and how an application should make system calls to the operating system; and in the case of a complete operating system ABI, the binary format of object files, program libraries and so on. Several ABIs (e.g., the Interactive Unix ABI allowing to a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

The compiler works on a single source file (compile unit) at a time to generate object files. The complier generates object code without knowing the final address or displacement of the code/data. Specifically, the compiler generates object code that will access a TOC for variable values without knowing the final size of the TOC or offsets/addresses of various data sections. Placeholders for this information is left in the object code and updated by the linker. A TOC is a variable address reference table that is utilized, for example in an AIX environment, to access program variables in a manner that supports shared libraries and is data location independent. A similar structure, referred to as a global offset table (GOT) performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

The linker collects object files into executable programs/shared objects and assigns offsets to code/data. The linker resolves internal references during program development and external references are resolved at load time. The linker collects the TOC entries from object files, assigns TOC offsets, and generates the TOC section. The linker knows the final size of the TOC but does not perform major edits to TOC access code sequences generated by the compiler. The linker knows the offsets for specific internal reference TOC entries but does not know the final resolved values for most external reference TOC entries. The external reference TOC entries are revolved by the loader/dynamic linker.

"Power ISA™ Version 2.06 Revision B" published Jul. 23, 2010 from IBM® and incorporated by reference herein in its entirety teaches an example reduced instruction set computer (RISC) instruction set architecture (ISA). The Power ISA will be used herein in order to demonstrate example embodiments, however, the invention is not limited to Power ISA or RISC architectures. Those skilled in the art will readily appreciate use of the invention in a variety of architectures.

"z/Architecture Principles of Operation" SA22-7832-08, Ninth Edition (August, 2010) from IBM® and incorporated by reference herein in its entirety teaches an example CISC (complex instruction set computer) instruction set architecture.

"64-bit PowerPC ELF Application Binary Interface Supplement 1.9" (2004) from IBM and incorporated by reference herein in its entirety describes the 64-bit supplement to the PowerPC® Executable and Linking Format (ELF) ABI.

"Power Architecture® 32-bit Application Binary Interface Supplement 1.0 Linux®" (Apr. 19, 2011) and "Power Architecture® 32-bit Application Binary Interface Supplement 1.0-Embedded" (Apr. 19, 2011) from power.org and incorporated by reference herein in their entirety describe the 32-bit ABI.

SUMMARY

According to exemplary embodiments, a method includes reading an object file that includes a plurality of code sequences. A code sequence in the object file that specifies an offset from a base address is identified. The offset from the base address corresponds to an offset location in a memory configured for storing either an address of a variable or data. The identified code sequence includes multiple instructions and is configured to perform either a memory reference function or a memory address computation function. It is determined that the offset location is within a specified distance of the base address. In addition, it is verified that a replacement of the identified code sequence with a replacement code sequence will not alter program semantics. The identified code sequence in the object file is replaced with the replacement code sequence. The replacement code sequence includes a no-operation (NOP) instruction or fewer instructions than the identified code sequence. Linked executable code is generated based on the object file and the linked executable code is emitted.

According to another exemplary embodiment, a method includes reading an object file that includes a plurality of code sequences that include symbols as placeholders for offset locations in a reference table. Each offset location is configured for storing either an address of a variable or data. Access frequency information associated with the code sequences is received. The plurality of code sequences are ordered by access frequency. Cost information associated with the offset locations is received. For each symbol in the code sequences, starting with a code sequence with the highest access frequency, an offset location in the variable reference table is assigned to the symbol and the symbol is replaced with the offset location in the object file. The assigned offset location has a lowest cost of offset locations that have not previously been assigned to another symbol. The object file is then emitted.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
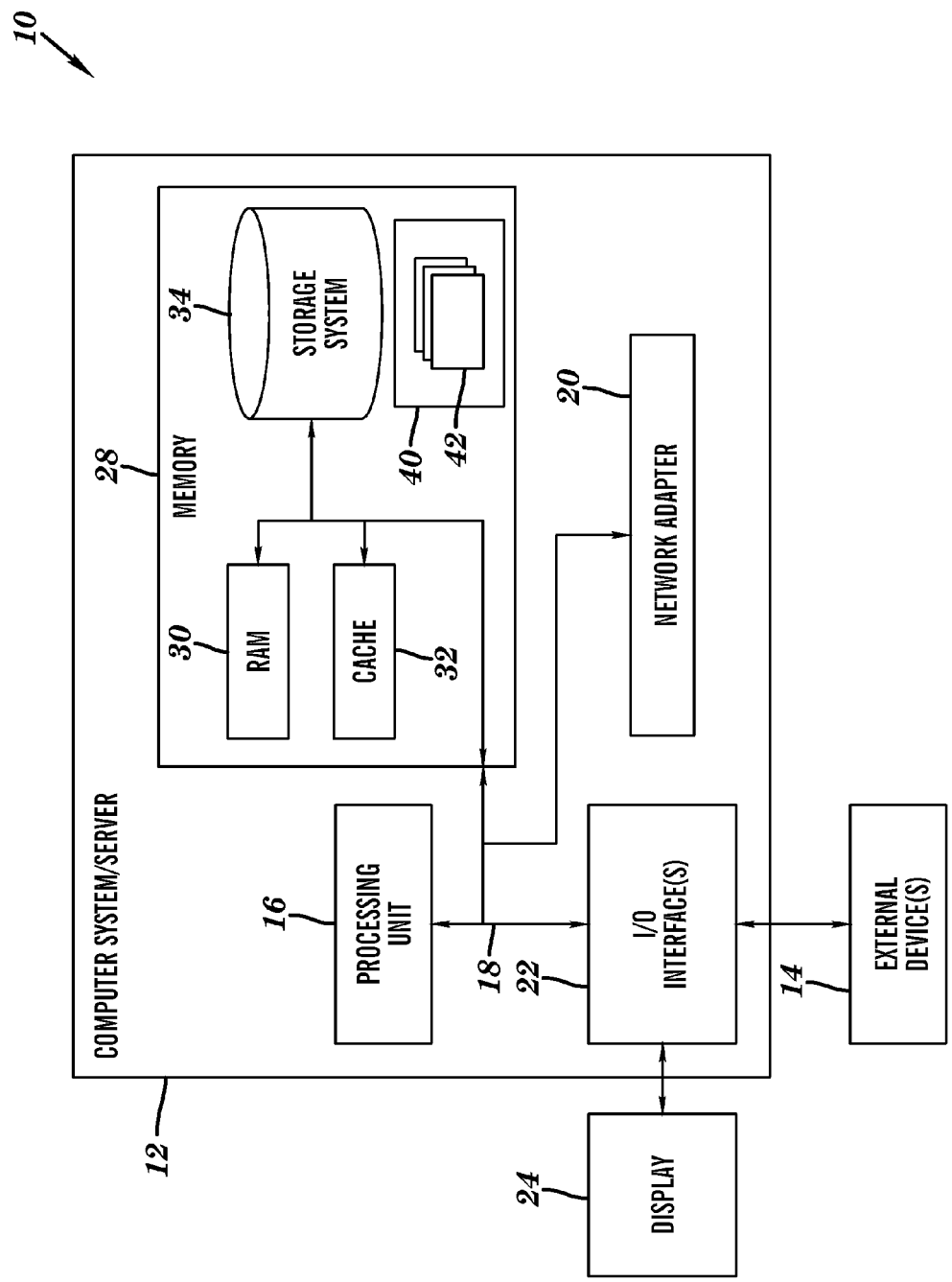
FIG. 1 illustrates a cloud computing node according to an embodiment of the present invention.

An embodiment of the present invention is directed to minimizing the impact of table of contents (TOC) overflow on performance and throughput in a computing system. An embodiment includes a compiler tailored to generate object code to include specified instruction sequences (e.g., sequences that have been inserted into the code in order to compensate for TOC overflow). The instruction sequences are adapted to be recognized by hardware such that a microprocessor can optimize the sequence for internal execution. Upon locating one of the specified instruction sequences, the microprocessor either replaces an instruction(s) in the sequence with an internal instruction(s) that executes more efficiently, or replaces instructions in the sequence with a single internal instruction. This process performed by the microprocessor is referred to herein as decode time instruction optimization (DTIO).

The DTIO process is a hardware process. The compiler and the linker described herein prepare code sequences for optimization by the hardware. These code sequences are coded by the compiler and/or linker in a manner to be detected by DTIO enabled hardware, such as such as particular instructions being adjacent to each other, having a suitable displacement range when the displacement range is limited, having suitable properties such as being destructive when a processor has requirements on destructive code forms to enable DTIO, and being suitably aligned when a processor has requirements on instruction alignment to enable DTIO, and any other such properties as may be required by DTIO enabled hardware. DTIO enabled hardware is further described in United States patent application titled "Sealable Decode-time Instruction Sequence Optimization of Dependent Instructions", Ser. No. 13/251,409, filed Oct. 3, 2011 which is incorporated herein by reference in its entirety.

Embodiments also include a linker tailored to improve performance of TOC references across all processors, both those that are DTIO enabled and those that are not DTIO enabled. The linker performs several TOC reference code optimizations based on characteristics such as reference frequency and displacement values. The optimized code performs the same function(s) as the original TOC reference code. A TOC and a GOT are examples of reference tables. Both a TOC and a GOT may be variable address reference tables that store addresses of variables. In addition, a TOC may also store data. Unless specified otherwise, the terms TOC and GOT are used herein interchangeably to refer to a table that is accessed to locate program variables.

A DTIO process may be performed in a cloud computing environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
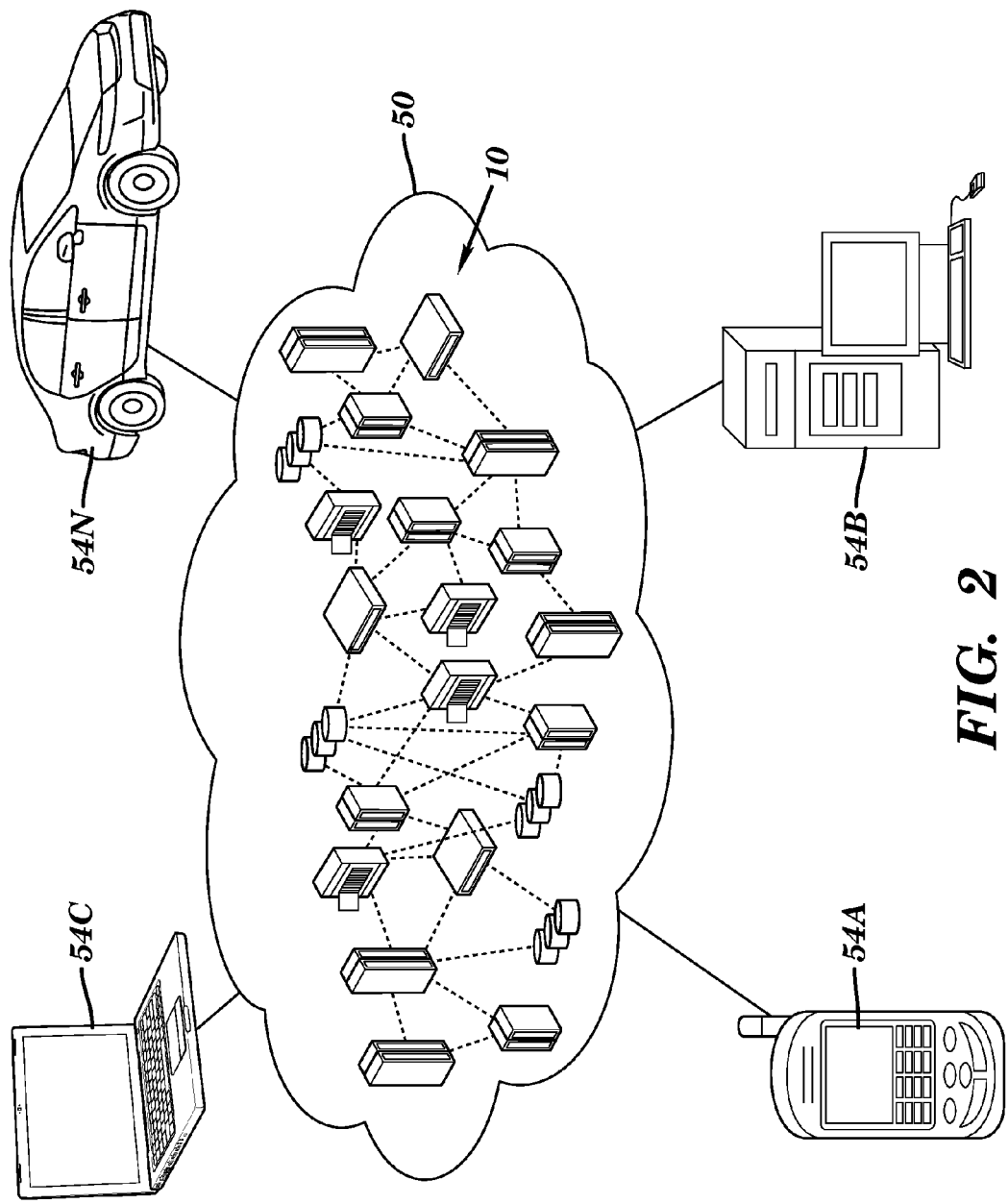
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
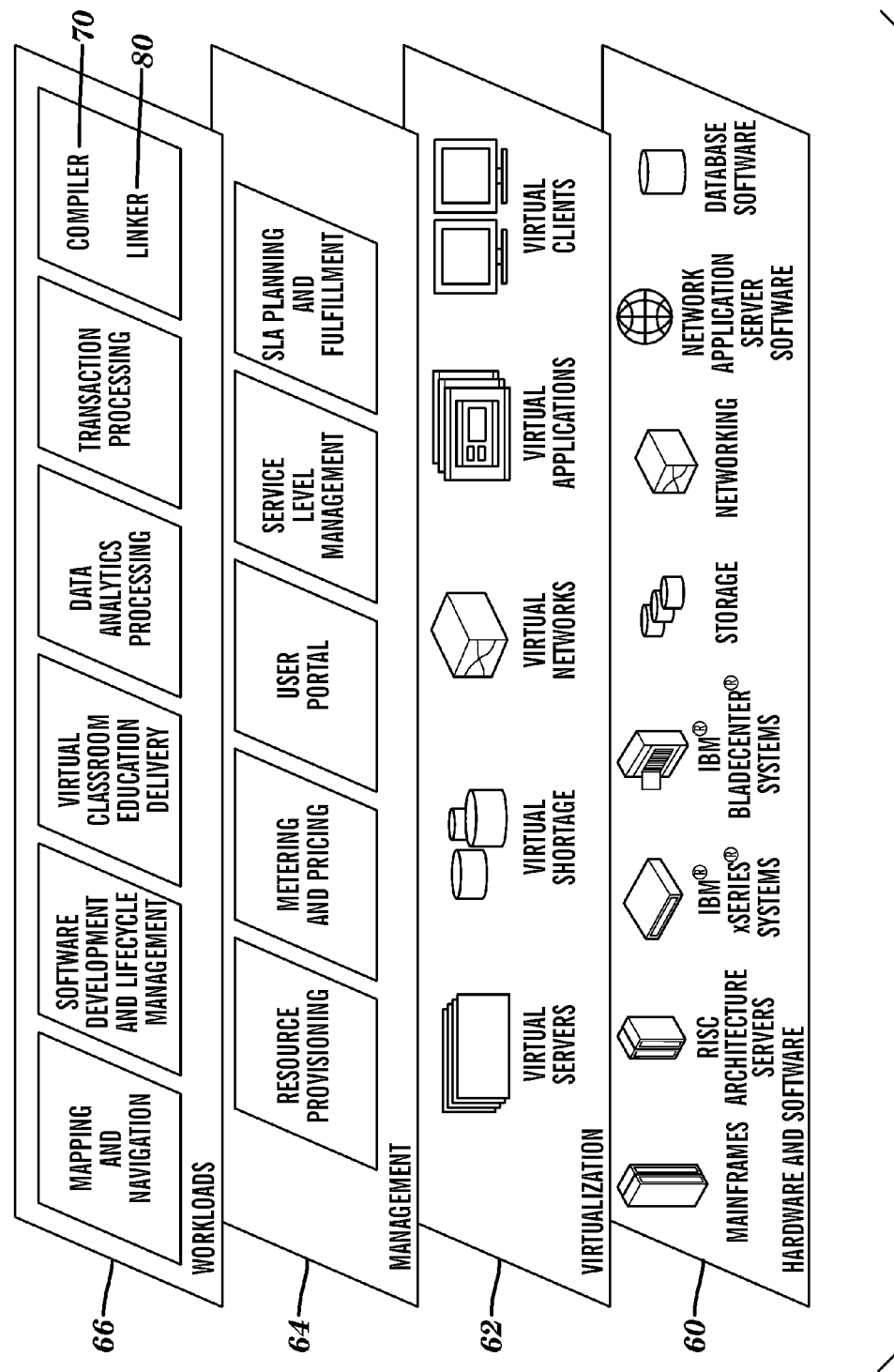
FIG. 3 illustrates abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data integration workflow processing.

In an exemplary embodiment, a DTIO enhanced compiler 70 in the workloads layer 66 generates the DTIO sequences described herein; however, it will be understood that the enhanced compiler 70 may be implemented in any layer and may be used to generate code to be executed on a variety of hardware platforms in the hardware and software layer 60.

In an exemplary embodiment, a DTIO enhanced linker 80 in the workloads layer 66 generates the DTIO sequences and optimizes TOC references as described herein; however, it will be understood that the enhanced linker 80 may be implemented in any layer and may be used to generate code to be executed on a variety of hardware platforms in the hardware and software layer 60.

In one embodiment, the enhanced compiler 70 optimized to generate DTIO sequences executes on a processing unit 16 of a computer system/server 12 executing in a cloud environment 50, or on a system 54A, 54B or 54C adapted to develop applications for a cloud environment 50. In one embodiment, the enhanced linker 80 optimized to link and optimize table references in an application executes in a processing unit 16 of the same server 12 of a cloud environment 50, or one of systems 54A, 54B or 54C. In another embodiment, the enhanced compiler 70 and the enhanced linker 80 execute on different processing units 16 of at least one server or computer system corresponding to cloud environment 50, or systems 54A, 54B and 54C.

The enhanced compiler 70 and enhanced linker 80 together generate an application directed towards executing on a processing unit 16 implementing DTIO when the generated application is executed, either within a server 12 of a cloud environment 50, or at least one of a system 54A, 54B, 54C and 54N. The generated application is stored in a storage medium such as virtual storage 62, external device 14, or another solution such as internally installed system flash memory.

Figure 4:
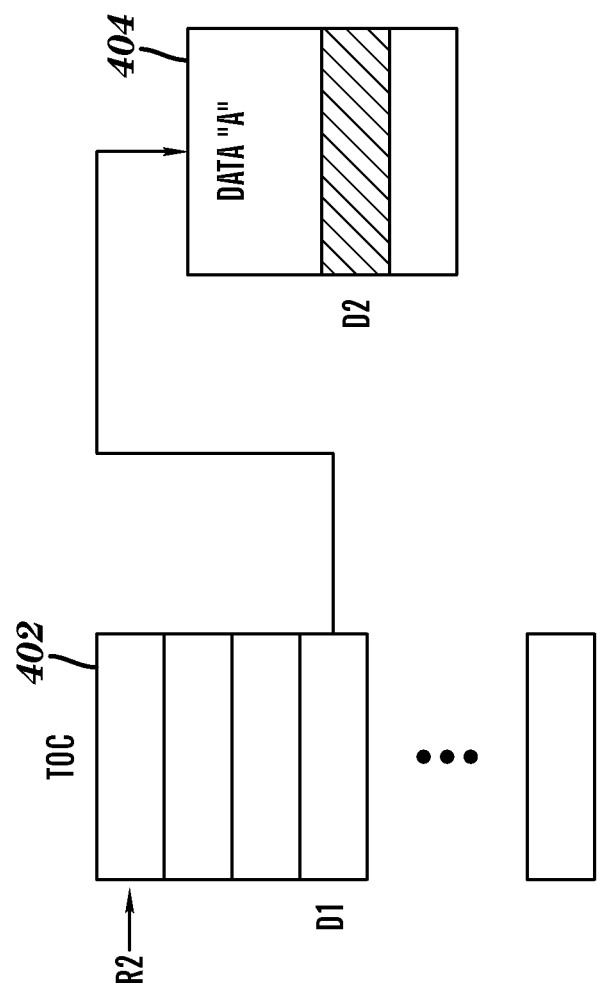
FIG. 4 illustrates a table of contents (TOC) and a data element in accordance with an embodiment of the present invention.

Turning now to FIG. 4, a TOC 402 and a data object 404 (labeled Data "A") in accordance with an embodiment is generally shown. The TOC 402 is utilized to access variables and supports shared libraries by providing a position independent manner for application code to access data. The TOC is used to resolve external references to shared data, where each address entry in the TOC contains the address of a variable. The TOC allows the same application code to refer to different data because the application code and the data are not fixed with respect to each other. The TOC 402 shown in FIG. 4 starts at the address contained in register "R2", has a plurality of entries (each containing an address of a variable) including an entry at offset "D1". The address in the entry at offset "D1" is the starting address of the data object 404. The data object 404 shown in FIG. 4 has data stored at an offset of "D2" from the starting address of the data object 404.

The following object code sequence loads the data stored at offset "D2" in the data object 404 into register "R4".
  ld R3=R2+D1
  ld R4=R3+D2
The first load instruction loads the address of the data object 404 from the TOC 402 at offset "D1" into register "R3", and the second load instruction loads the data from the data object 404 at offset "D2".

As described previously, in other application binary interface (ABI) definitions, a table similar to the TOC is referred to as a GOT. Descriptions herein referring to the TOC 402 may be similarly applied to GOTs.

A compiler, such as enhanced compiler 70, and a linker, such as enhanced linker 80, work together to generate code that references variables via the TOC. The compiler generates object code and creates links between the TOC load instructions and symbol table entries (e.g., global variables). The linker resolves symbol definitions and references, maps all of the data (builds the TOC), and then enters the values in the displacement fields on the TOC load instructions generated by the compiler.

The following object code sequence to load the data stored at offset "D2" in the data object 404 into register "R4" is generated by the compiler when the compiler doesn't know the offset location in the TOC 402 of the address of the data object 404.
  ld R3=R2+0 [Ref Symbol "A"]
  ld R4=R3+D2
  Symbol="A"
  Length=24
  Alignment=8
  etc.
The linker inserts the offsets in the TOC when linking the applications together. The symbol, length and alignment portions of the above code tell the linker about the data object and tie it to the first load statement. The linker resolves symbol "A", maps the data, allocates a TOC entry at D1 and then overwrites the displacement field in the associated TOC load instructions.

The addressing range of the immediate displacement field in memory access instructions is limited by what is supported by the computer architecture. For example, in the IBM Power Architecture® the displacement is limited to 16 bits which provides the ability to address data within 64 kilobytes (KBs) from a base register. Other ABIs are limited to 32 bits or to 64 bits. These limitations can pose problems when the number of variables is larger than the number of entries supported by the TOC.

The instruction set (e.g., D-form, DS-form) and the convention used to generate TOC references practically limits the size of the TOC. A D-form instruction is one of the primary memory access instructions forms on a PowerPC® processor and it is used to perform loads, stores, and immediate mode calculation, and is limited to a 16 bit address field. The format of a D-form instruction is: opcode in bits 0-5, source/target register in bits 6-10, address/index register/operand in bits 11-16, and numeric address/offset/immediate-mode value in bits 16-31. Thus, the address field is only 16 bits, translating into an address range of 64 KBs. The linker maps the TOC using a signed 16-bit displacement (+/−32 KBs) by having the register (e.g., register "R2" pointing to the middle of the TOC). A DS-form instruction has the same address range as a D-form instruction, however, the DS-form instruction is limited to 32-bit aligned memory.

When the TOC runs out of space (e.g., there are more than 64 thousand or 64K variables), the linker may fail with an error message. Alternatively, the linker may create multiple TOCs and use "trampoline" code to switch between the multiple TOCs. Thus, if a requested variable is not in the current TOC, the address of an alternate TOC is loaded in order to accesses the requested variable. For example, object code, where the offset of reference symbol "A" does not fit into the displacement offset of the instruction is shown below.
  ld R3=R2+0 [Ref Symbol "A"]
  ld R4=R3+D2
Is translated by the linker into object code:

|         |           |
| ------- | --------- |
| b       | L1        |
| L2:ld   | R4=R3+D2  |
| ......  |           |
| L1:addis| R3=R2,1   |
| ld      | R3=R3+D1  |
| b       | L2        |

As shown above, a branch instruction is added by the linker. In this example, there are two 64 KB TOCs located next to each other in memory. The base of the first TOC is located in memory at the address contained in register "R2" and the base of the second TOC is located at the address contained in register "R2"+64 KB. The base of the second TOC is calculated as shown above with an "addis" instruction which shifts the contents of register "R2" 16 positions to the left to get to the location of the second TOC. The offset, "D1" is then calculated with respect to the base of the second TOC and the code branches back to "L2" to continue processing.

Thus, as shown above, in order to accommodate a larger number of variables, the linker introduces additional instructions to the object code, leading to both code expansion and slower execution. The use of TOC overflow trampolines, as shown above leads to excessive code expansion due to additional trampoline code and that introduces two additional control flows per reference. This may result in poor cache performance due to loss of locality of reference, as well as poor instruction fetch performance due to the non-sequential code introduced by branches to the trampolines.

The size of a TOC is roughly proportional to the size of an executable or shared library. Commonly there are hundreds of source files and hundreds of thousands of lines of code. Every unique, referenced external symbol (data or code) has a TOC entry. As described above, in a 32-bit mode the capacity of the TOC is 16K entries, and in a 64-bit mode is 8K entries. Additional TOC space is consumed when data is stored in the TOC (e.g., to shorten the path length by removing a level of indirection).

Another contemporary approach to solving the problem of TOC overflow is to introduce a new instruction with a larger displacement. This approach works for computer platforms that support the larger displacement value, however code that utilizes the new instruction will not be executable on older computer systems or other computer platforms systems that do not support the larger displacement value (e.g., IBM RISC architecture). In most cases, it is desirable for application code to be executable in as many environments as possible and developers will be hesitant to use new instruction formats that limit the ability to execute the code on older platforms.

Embodiments described herein reduce the number of internal operations that must be executed by a processor (e.g., a microprocessor) when accessing global data in an environment characterized by TOC overflow relative to a TOC size determined by a directly specified displacement in an instruction set. The hardware process for optimizing and combining multiple instructions such that a second instruction is replaced by an internal operation (internal instruction) that can be executed independently of a first instruction in an instruction sequence is referred to herein as decode time instruction optimization (DTIO). A first instruction can either be executed without the need to execute the first instruction prior to executing the second instruction, or be eliminated from the internal execution. DTIO is a technology that allows a processor to generate improved instruction sequences based on an instruction sequence being optimized. In accordance with embodiments described herein, the compiler generates ABI sequences adapted to exploit DTIO capabilities in the processor. In order to support efficient execution of programs with large TOCs/GOTs, the processor is adapted to perform DTIO on key sequences.

DTIO is applied to the following code sequence generated by the compiler to combine this code sequence into two instructions that run more efficiently. The object code shown below adds the 16 high order bits of the offset value (entered by the linker during the linking process) to the starting address of the TOC (address is stored in register "R2") and stores the result in register "R5" (R2+0x12340000). The second instruction loads the contents memory at the address as the sum of the address stored in register "R5" and the 16 low order bits of the offset value (R2+0x12340000+ 0x00005678). As a result, register "R3" contains the address of the data object. The second instruction is dependent on the first instruction, in that it cannot be executed until the value for register "R5" is determined.

addis R5, R2, 0x1234
    ld R3=R5+0x5678

In one exemplary embodiment, a processor unit 16 enabled to perform DTIO identifies the above code pattern and replaces it with the following two internal instructions (or, internal operations) that are not dependent on each other.

The first instruction result is computed in case another code instruction uses the value stored in register "R5". The second internal instruction, a load instruction, generated by DTIO performs in one calculation, the calculation previously performed by the sequence of two adjacent instructions above. The internal load instruction (a load instruction able to process wider offset values than supported by the Power ISA) adds the value of the combined offset from the instructions above to the address stored in register "R2".

addis R5, R2, 0x1234
    ld R3=R2+0x12345678

The above code sequence is referred to as a non-destructive operand sequence because the intermediate result in register "R5" needs to be preserved in case a later instruction read the value in register "R5". Advantageously, the second instruction can be executed out of order with respect to the first instruction, accelerating the completion of the load instruction.

The first code sequence shown above may be written as a GOT access sequence as follows.

addis R5, R2, label@got@h
    ld reg, label@got@l(R5)

This code sequence is optimized by a processor unit 16 using DTIO into an internal operation (IOP) sequence corresponding to the following sequence.

addis R5, R2, label@got@h
    ld reg, label@got(R2)

The first instruction is an add shift immediate IOP and the second instruction is a load IOP. In this non-destructive code sequence the first instruction cannot be eliminated because register "R5" is part of the architected state after the DTIO sequence completes executing. Advantageously, the second instruction can be executed out of order with respect to the first instruction, accelerating the completion of the load instruction. Those skilled in the art will understand that in one embodiment @h can be context sensitive and be used to refer to the high order bits computed corresponding to the definition addis instructions when used in conjunction with an addis instruction, and to the high order bits computed corresponding to the definition oris instructions when used in conjunction with an oris instruction in conjunction with prior art. Those skilled in the art will understand that in another embodiment, two different specifiers @ha and @h will be used in a context insensitive manner and @ha will used to refer to the high order bits computed corresponding to the definition addis instructions when used in conjunction with an addis instruction, and @h will be used to refer to the high order bits computed corresponding to the definition oris instructions when used in conjunction with an oris instruction in conjunction with prior art.

A second code sequence that will be modified in at least one embodiment by a microprocessor unit 16 implementing DTIO follows. This code sequence may be referred to as a destructive operand sequence because register "R3" is overwritten by the second instruction.

addis R3, R2, 0x1234
    ld R3=R3+0x5678

These two instructions are merged into a single load IOP as follows.

ld R3=R2+0x12345678

Advantageously, only one IOP has to be executed in lieu of a sequence of two dependent operations.

The second destructive operand code sequence shown above may be written as a GOT access sequence as follows.

addis reg, R2, label@got@h
    ld reg, label@got@l(reg)

This code sequence is optimized by processor unit 16 implementing DTIO into a single IOP corresponding to the following sequence that contains a single load instruction.

ld reg, label@got(R2)

Embodiments described herein are directed to programs that contain instruction sequences adapted to accessing large TOCs (i.e., overflowing TOCs with respect to the addressability provided by instruction-specified displacements). The instruction sequences to access the TOC include a sequence of computational instructions that may be further optimized by the DTIO process. The optimization results in a reduction in the number of internal operations in the critical dependence chain for accessing the TOC. In an optimized environment that uses destructive forms of TOC addressing subject to DTIO, the actual number of internal operations for accessing the TOC is reduced.

Advantages of using DTIO optimization is that the code sequences are fully portable between processors that have hardware support for DTIO and legacy (or non-DTIO supported processors). In one embodiment, sequences optimized by DTIO correspond to sequences of instructions in accordance with a pre-existing ISA. The compiler and linker collaborate to assemble sequences in a manner conducive to DTIO optimization in a microprocessor supporting DTIO. In a microprocessor not supporting DTIO, the sequence consisting of prior art instructions will be executed directly and compatibly, as any other sequence of instructions in accordance with the pre-existing ISA.

Figure 5:
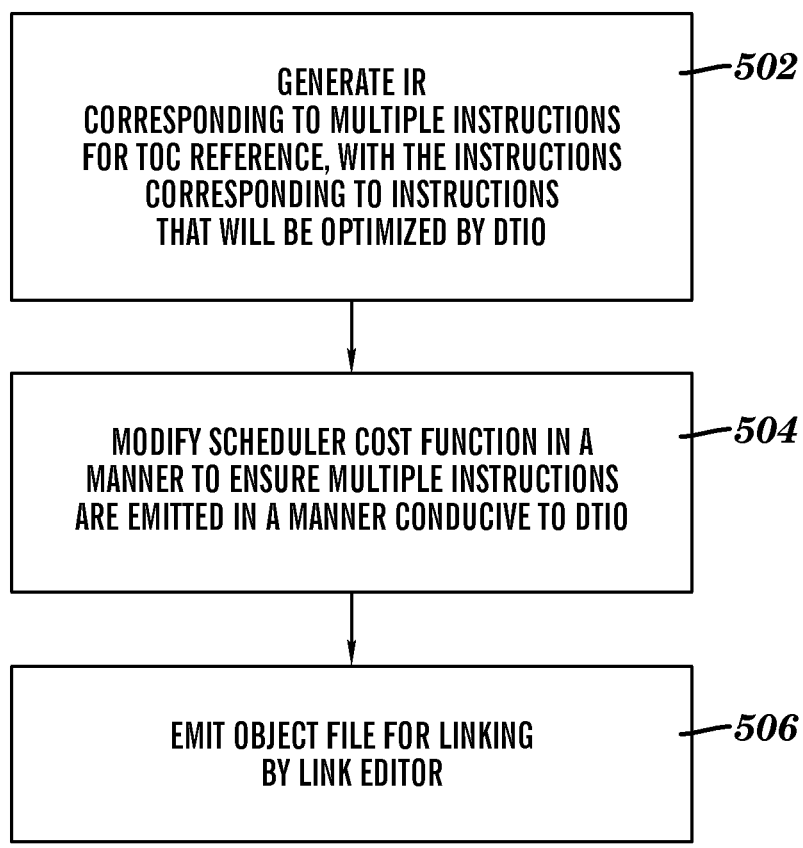
FIG. 5 illustrates a flow diagram of a process performed by a compiler to generate TOC references in accordance with an embodiment of the present invention.

FIG. 5 illustrates a flow diagram of a process performed by a compiler to generate TOC references in accordance with an embodiment of the present invention. In an embodiment the process is performed by the enhanced compiler 70 shown in FIG. 3. At block 502, an internal representation corresponding to multiple instructions for a TOC reference is generated. These instructions are the instructions that will be optimized by the DTIO process as described previously.

At block 504, the scheduler cost function in the compiler is modified in a manner to ensure that multiple instructions are emitted in a manner that is conducive to DTIO. As used herein, the term "scheduler" refers to the part of the compiler that is responsible for generating an "instruction schedule", i.e., assigning the order in which instructions appear in the program. One of the goals in a scheduler is typically to move dependent instructions as far away from each other, so as to give a first instruction the time to complete before a second dependent instruction consumes its result. In many cases, this conflicts with a processor implementing DTIO that may have specific requirements for instructions to be DTIO'ed, such as instructions being within a certain range of each other, or to be adjacent to each other. Thus, a typical scheduler does not order the instructions in a manner that is supports DTIO in a DTIO enabled processor. One way the cost function in the complier can be modified is by setting the cost function for the first instruction (e.g., addis) to zero when it is generated as part of a TOC access sequence. This can be done by allocating a new instruction register (IR) for an addis instruction when it is associated with a TOC sequence. The scheduler will then tend to schedule the first addis instruction and a second instruction next to each other. The scheduler can be further modified to ensure that instructions with a zero cost metric are scheduled next to consumer. Another way to ensure that multiple instructions are emitted in a manner conducive to DTIO is to modify the scheduler in order to schedule a first instruction of a TOC sequence next to a second instruction of the TOC sequence (i.e., the first instruction and the second instruction are sequential). This may be done by allocating a new IR for the addis associated with TOC sequence, and when a first instruction is scheduled for a TOC reference, the second instruction is scheduled. A further way to ensure that multiple instructions are emitted in a manner conducive to DTIO is to modify the scheduler to recognize pairings off addis instructions and dependent instructions for which DTIO can be applied, and then to cause the scheduler to schedule them next to each other.

Referring to FIG. 5, at block 506, the compiler generates instructions to the linker, e.g., in the form of relocation information to indicate any entries in the TOC (or GOT) references that need to be part of the GOT/TOC, as well as indicating which instructions need to have at least a portion of an offset corresponding to an offset within a completed TOC inserted into the instruction. In accordance with one embodiment, relocation information is generated indicating a multi-instruction sequence. In accordance with another embodiment, separate relation information is generated indicating a first portion of an offset for a reference, and indicating a second portion of an offset for a reference, in accordance with prior art.

Figure 6:
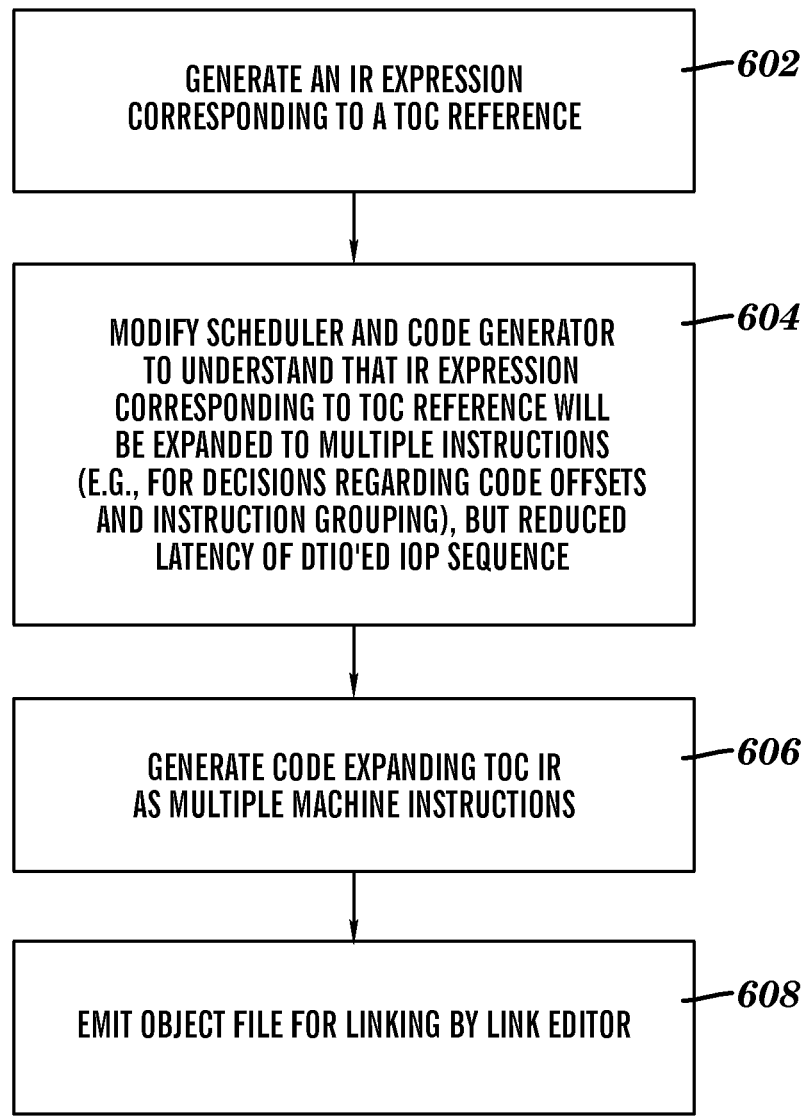
FIG. 6 illustrates a flow diagram of a process performed by a compiler to generate TOC references in accordance with an embodiment of the present invention.

FIG. 6 illustrates a flow diagram of a process performed by a compiler to generate TOC references in accordance with an alternate embodiment of the present invention. The embodiment shown in FIG. 6 may be utilized when the compiler has a TOC reference IR facility. This allows the compiler to use a single internal representation for a TOC reference that will be emitted as a sequence into the code, and model more accurately the execution of this sequence with respect to instruction scheduling and not require a modification to allow a "zero cost" addis-type instruction in the IR. In accordance with the IR representation of a TOC reference as a single IR reference, portions of the compiler needing to be cognizant of instruction counts are modified to be cognizant of the fact that said TOC reference IR facility will be emitted as a plurality of ISA instructions, such as for tracking displacement for OC-relative branches, for modeling instruction group formation, for aligning branch targets to desirable boundaries, and so forth.

At block 602, an IR expression corresponding to a TOC reference is generated to signal to the processor that this IR expression is a TOC reference. At block 604, the scheduler and code generator in the compiler are modified to understand that the IR expression corresponding to the TOC reference will be expanded to multiple instructions (e.g. for decisions regarding code offsets and instruction grouping), but corresponding to the reduced latency of DTIO'ed IOP sequence. Thus, for instruction formatting purposes, the TOC IR reference sequence is treated as a plurality of instructions when emitted into the object file by the compiler, however, for modeling the timing behavior of the IR reference the internal operation sequence generated by the DTIO function in hardware at runtime is used to make scheduling decisions.

At block 606, code is generated by expanding TOC IR as multiple machine instructions. The object file is emitted for linking by the link editor at block 608. In the embodiment shown in FIG. 6, the compiler is extended to support a new IR code for a TOC reference which reflects that the TOC load will use more than a single load instruction in binary, but can be executed in a reduced number of cycles corresponding to DTIO'ed sequence.

In another embodiment, a programmer generates assembly code containing TOC references which can be DTIO'ed, and the assembler generates an object file. The programmer may be responsible for generating multiple assembly instructions corresponding to a DTIO'ed sequenced. Alternatively, an assembler intrinsic, expanded mnemonic, or macro is provided that will generate a TOC load sequence containing the plurality of DTIO instructions.

For example an enhanced assembler that would accept the enhanced syntax @got32 and generate the destructive form of the two instruction sequence addis/ld. In this example the single assembler operation:

ld reg,lable@got32(R2)

generates the binary instructions and relocations equivalent to:

addis reg,lable@got@ha(R2)
ld reg,lable@got@l(reg)

This is consistent with the current PowerISA and will execute correctly on PowerISA processors without the DTIO feature, but reflects that programmer intention that this operation executes optimally on DTIO enabled processors.

Hardware restrictions may impact the DTIO process. For example, some hardware systems may only support destructive DTIO sequences. In other hardware systems there is a limit on the displacement size that can be subjected to the DTIO process (e.g., limited to offsets of 21 bits or less). These restrictions may be communicated to the compiler and/or programmer so that they are cognizant of which sequences will map to target hardware DTIO capabilities.

In some embodiments, e.g., when compiling for a Linux system, a compiler is optimized to generate data addresses by derivation of data addresses within the TOC, when a main module computes the address (rather than loading it from a GOT) by adding a displacement to a TOC base. An example code sequence follows.

addis reg,R2,label@got@h
ld reg,label@got@l(reg)

In one aspect of the present invention, this code may be replaced with the following code sequence, either by a compiler during code generation, or by a linker during linking.

addis reg,R2,label@toc@ha
addi reg,reg,label@toc@l

In accordance with an aspect enabling hardware-based DTIO by code generation in a compiler, a microprocessor 16 implementing DTIO will then optimize the replacement code sequence to the following code sequence.

addi reg,reg,label@toc

Optimization targeting the generation of TOC references using addis/addi may also be applied. This can include assigning a TOC-compute IR in addition to a TOC/GOT-load reference IR point in accordance with the process shown in FIG. 6, and modifying the metrics for addis/addi combinations in accordance with the process shown in FIG. 5.

The compiler also may improve the performance of a GOT load followed by a TOC data reference. An example code sequence follows.

addis reg,R2,label@got@h
ld reg,label@got@l(reg)
ld reg,structure_offset(reg)

This code sequence may be replaced with the following code sequence.

addis reg,R2,(label+structure_offset)@toc@h
ld reg,reg,(label+structure_offset)@toc@l DTIO will then optimize the replacement code sequence as the following single IOP.

ld reg,reg,(label+structure_offset)@toc//iop

Note that the structure_offset is often zero. The approach may also be used for non-integer loads to load non-integer data, however, the form will not be destructive and thus requires support for non-destructive DTIO.

Embodiments of a linker, such as DTIO enhanced linker 80, are described below in reference to FIGS. 7-11. The linker described herein optimizes the performance of compiler generated code related to TOC and/or GOT references both for processors that offer a DTIO facility and for processors that do not offer a DTIO facility. Those skilled in the art will appreciate that these optimizations may also be performed as part of compilation when whole program compilation includes generating fully linked object code.

Figure 7:
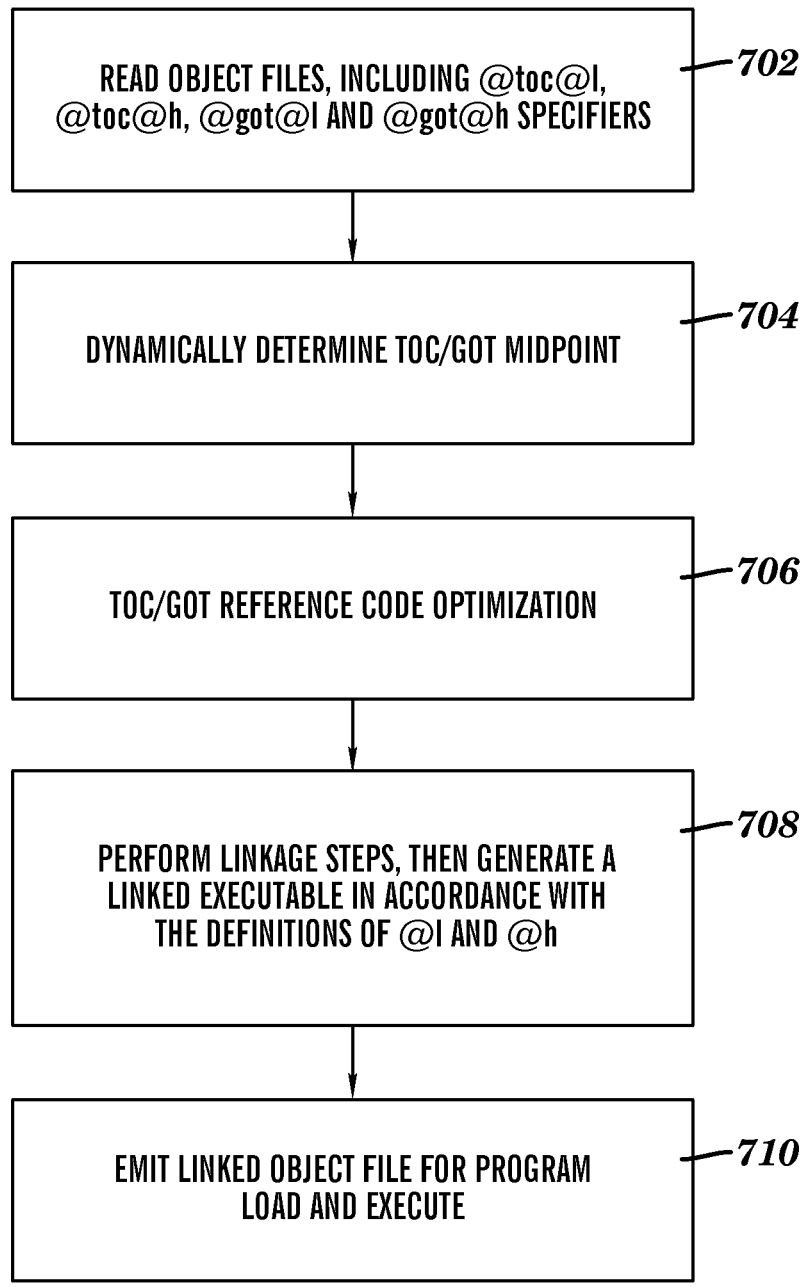
FIG. 7 illustrates a flow diagram of a process performed by a linker to create a linked object file in accordance with an embodiment of the present invention.

FIG. 7 illustrates a flow diagram of a process performed by a linker to create a linked object file in accordance with an embodiment of the present invention. In an embodiment, the linker process is implemented by the enhanced linker 80. At block 702, the linker reads object files, and locates one or more of the specifiers: @toc@l, @toc@h, @got@l, and @got@h. The linker, after it builds the TOC and/or GOT replaces these specifiers with the actual high and low address offsets of the specified data and/or data references in the TOC and/or the GOT. In general, the code produced by the enhanced compiler 70 may be further optimized by the linker with respect to one or more of: data layout in the TOC and/or GOT and use of addressing ranges in DTIOed code (i.e., code that is being optimized by the DTIO hardware facility); use of TOC address computation in lieu of GOT loads where feasible; and elimination of unnecessary addis instructions for improved execution in processors not having DTIO hardware support.

At block 704, the linker dynamically determines the midpoint of the TOC. Because the TOC uses signed displacement, finding the midpoint of the TOC gives the best coverage of low-cost addressing over the data structure. For performance reasons, it is desirable to have about half of the addresses above the midpoint and about half of the addresses below the midpoint. In contemporary linkers, the midpoint is determined statically because the size of the TOC is fixed prior to this step (e.g., at 16K entries). In embodiments described herein, the TOC is not a fixed size and it is extendable based on the number of variables in the object code segments being linked by the linker. Because the size of the TOC is not fixed, the midpoint of the TOC has to be determined based on the total GOT and data size as part of the linking process. Block 704 was described with reference to a TOC, however, the same process may performed by the linker for a GOT.

At block 706, reference code optimization is performed including, but not limited to: reference sequence pruning, reference-frequency based TOC and/or GOT packing, and GOT load to TOC compute expansion. An embodiment of each of these reference code optimizations are discussed herein below. At block 708, the linker performs linkage steps (e.g., replacing all references to symbols that are resolved at link times with actual values, combining multiple object files being linked into a single object file, optionally adding call stubs such as glink or PLT stubs) and generates a linked executable in accordance with the definitions of @l and @h wherein high and low portions of symbolic values are inserted into the linked executable. At block 710, the linked object file is emitted for program load and execution.

In an embodiment, a linker, such as the enhanced linker 80 is used to perform a memory reference code optimization process such as memory reference sequence pruning. In an embodiment, memory reference sequence pruning includes identifying a code sequence in the object file that contain a plurality of instructions and that specifies an offset from a base address. The offset from the base address corresponds to an offset location in a memory configured for storing one of an address of a variable and a data. The identified code sequence is configured to perform one of a memory reference function and a memory address computation function. In order to apply memory reference sequence pruning safely, the offset location must be within a specified distance of the base address and a replacement of the identified code sequence with a replacement code sequence cannot not alter program semantics (i.e., will not change the behavior of the program). If pruning is "safe", the identified code sequence is replaced in the object file with the replacement code sequence, where the replacement code sequence includes a no-operation (NOP) instruction or fewer instructions than the identified code sequence. As used herein the term "memory reference function" refers to the act of computing an address and accessing the memory location identified by the computed address with a read from operation or a write to operation. Instructions such as ld, lwz std or stw, as well as lfd stfd are examples of Power PC instructions that perform a memory reference function. An example of a memory reference function is a TOC reference function. As used herein, the term "memory address computation function" refers to the act of computing a memory address (e.g., by adding a displacement to a base address). An example of a memory address computation is to compute the address of an element. For example, consider a base address of a data item to be in register R5, and the compiler needing to derive the address of a structure field at struc_offset in R7. The compiler may emit the following sequence to compute the memory address of the structure field: addis R7,R5, struc_offset@ha; addi R7,R7, struc_offset@l.

Figure 8:
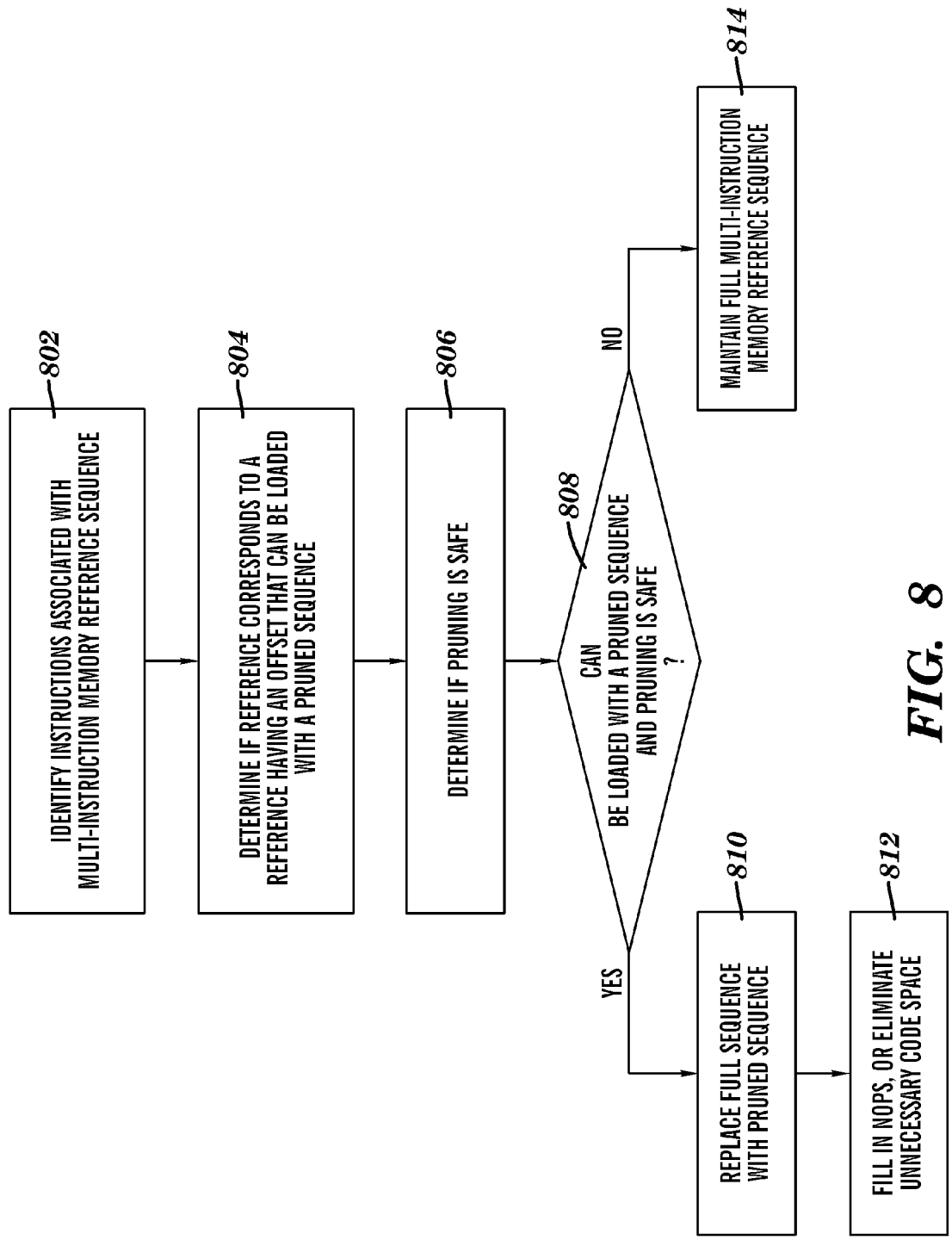
FIG. 8 illustrates a flow diagram of a reference code optimization process performed by a linker to perform memory reference sequence pruning optimization in accordance with an embodiment.

FIG. 8 illustrates a flow diagram of a memory reference code optimization process performed by a linker to perform memory reference sequence pruning in accordance with an embodiment. In an embodiment, the process shown in FIG. 8 is implemented by the enhanced linker 80. As described previously, the enhanced compiler 70 may generate a multi-instruction sequence, rather than a single instruction for memory references requiring big displacements. One example is TOC reference access. In accordance with another aspect of the present invention, data references are accessed with big displacements, e.g., in a C array reference:
    char x[BIG_SIZE], y;
    y=x[BIG_OFFSET]
can be translated as follows when the array base x is assigned to register 5, and the value y should be loaded to register R20:
    addis R20, R5 (array base), (LARGE OFFSET*4)@ha
    ld R20, R20, (LARGE OFFSET*4)@l In microprocessors that have DTIO hardware support, the multi-instruction sequence is replaced by the hardware with a single IOP operation (in the dependence chain) as follows:
    ld R20, R5, (LARGE OFFSET*4)

This replacement does not occur in processors that do not have DTIO hardware support and the process shown in FIG. 8, provides a process in the linker that is used to identify multi-instruction sequences that may be pruned.

Instructions associated with multi-instruction memory reference sequences are identified at block 802. Multi-instruction TOC reference sequences may be identified by looking for dependent instructions that match the format of the multi-instruction memory reference sequence. Alternatively, the sequences may be identified by having an object code format that explicitly identifies such sequences. At block 804 it is determined if an identified reference corresponds to a reference having an offset that can be loaded with a pruned sequence and at block 806, it is determined if pruning may be performed on the code sequence (is pruning "safe"). Processing flows from block 808 to block 810 if it is determined that the offset can be loaded with a pruned sequence and that pruning is safe. At block 810, the full code sequence is replaced with a pruned sequence and at block 812 the eliminated instructions in the code sequence are replaces with NOPs. An alternative to adding NOPs to the code sequence is to eliminate the unnecessary code space if full relocation information is available. Processing flows from block 808 to block 814 if it is determined that the identified reference does not correspond to a reference having an offset that can be loaded with a pruned sequence and/or that pruning is not safe. At block 814, the full multi-instruction reference sequence is left in the code sequence.

For example, the linker, at block 802 would identify the following instruction sequence as a multi-instruction GOT reference.
    addis reg, R5, label@ha
    ld reg, reg, label@l In this example, the displacement value associated with the data being accessed is within 32 KBs of the address stored in R5. Block 804 of FIG. 8 would determine that the code sequence has an offset that can be loaded with pruned sequence because the high order bits of the displacement are not be required. The high order bits are not require because the displacement value is within 32 KBs of the base address in R5 and thus, can be specified by the low order bits alone.

Assuming that pruning is determined to be safe at block 806, processing flows from block 808 to blocks 810 and 812 where the linker replaces the above code sequence with the following code sequence.
    NOP
    ld reg, R2, label@got@l
Because we removed the register dependency and the processor optimized the NOP case, resulting in only one instruction, the replacement code sequence is more efficient than the original code sequence.

Another code sequence that may be identified as a candidate for pruning is the following.
    addis reg, R5, offset@ha
    addi reg, reg, offset@l
In the above code sequence, the high level bits of the displacement are not required if the displacement value is within 32 KBs of the address in the base register.

If the displacement value is within 32 KBs of the base address to which the offset is being added, the linker replaces the above code sequence with the following code sequence.
    NOP
    addi reg, R5, offset@l An example of a coding sequence that may be identified in block 802 of FIG. 8 as being part of a multi-instruction memory reference sequence, and at block 804 as having an offset that can be loaded with pruned sequence because the high order bits of the displacement are not be required follows. In the following code sequence the linker will determine, at block 806, that pruning is not safe.
    addis reg,R5,offset@ha
    Li r5,0
    ld reg,reg,offset@l
This is not equivalent to the following pruned code sequence.
    NOP
    Li R5,0
    ld reg,R5,offset@l
Pruning on the above code sequence is not safe because the pruned code sequence is not equivalent to the original code sequence.

The linker may have a set of rules to determine whether or not pruning may be performed. For example, one rule may be that instructions in a multi-instruction memory reference sequence must be adjacent to each other. Another rule could be that performing analysis of the instructions between the first instruction of the sequence and the last instruction of the sequence, and ensuring that no write occurs to the base register being used in the first addis and used as the new base register in the subsequent instruction wherein the result of the pruned addis is replaced by the base of the addis instruction. Alternatively, or in addition, the compiler could indicate code sequences where pruning can be performed safely.

Advantageously, the memory reference identification method combined with a safety check offers the linker the opportunity to improve sequences using offsets unresolved at compile time when they can be determined to fit in a 16 bit displacement. In prior art, to avoid issues with introducing semantic altering optimizations, only references using registers known to be a constant within a function, such as a TOC base, was used. In accordance with the present invention, another rule could be that references must occur using a TOC base register which is defined by the ABI to be unchanged by the application program to capture additional prior art code improvement opportunities in an enhanced method in addition to the optimization opportunities taught herein in accordance with the present invention.

Figure 9:
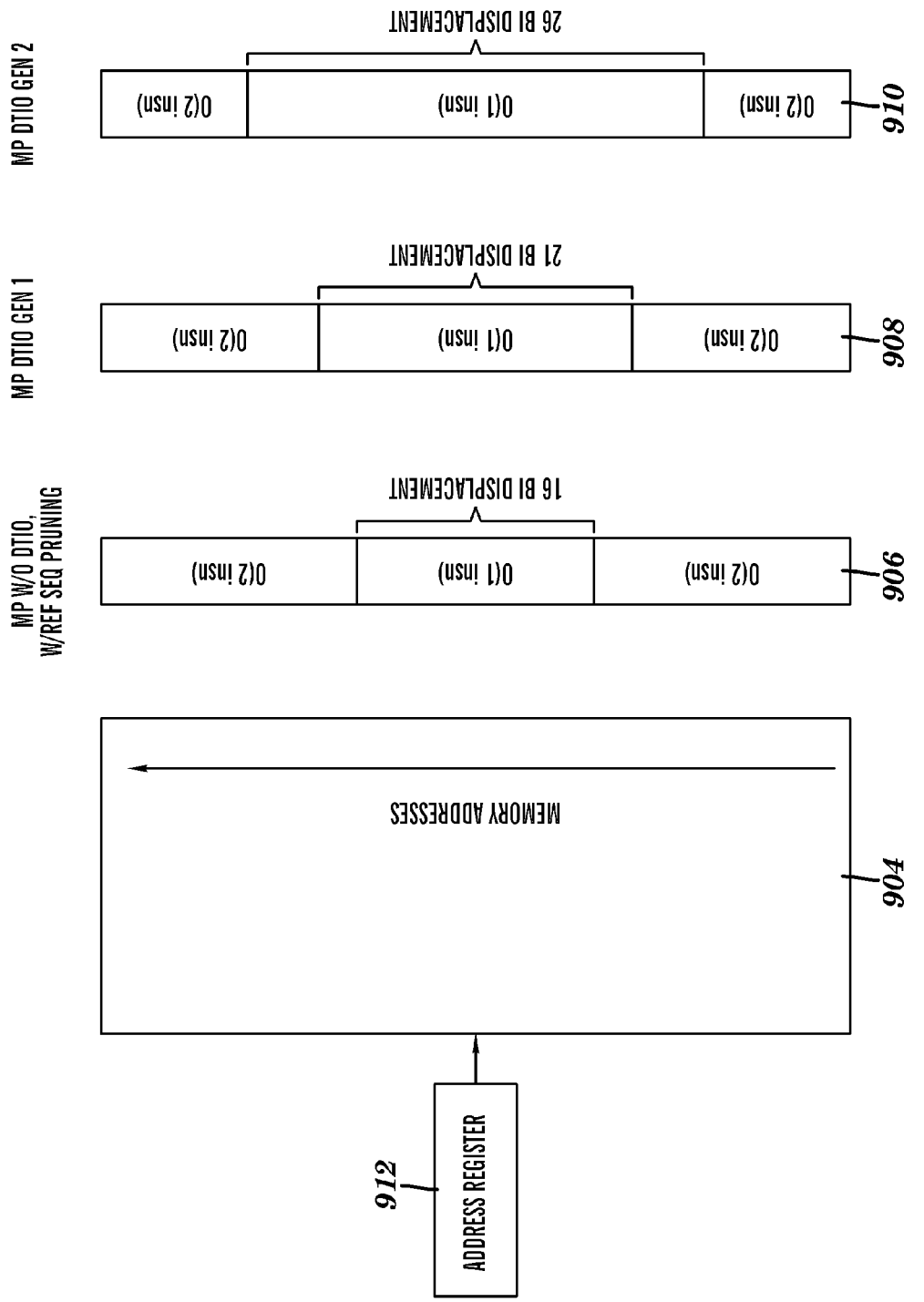
FIG. 9 illustrates a block diagram of a TOC addressing scheme in accordance with an embodiment of the present invention.

Another reference code optimization that may be performed by the linker is reference frequency based TOC reference packing. Depending on the processor, different distances from the TOC (or GOT) base may have different costs. Turning now to FIG. 9, a block diagram of a TOC addressing scheme in accordance with an embodiment of the present invention is generally shown. FIG. 9 depicts a TOC 904 having a range of memory addresses and a TOC address register 912 (e.g., register "R2" in the above examples) pointing to the base of the TOC 904. As shown in FIG. 9, the TOC address register 912 points to the midpoint of the TOC 904 that was dynamically calculated by the linker.

FIG. 9 depicts an access cost 906 associated with a microprocessor (MP) that does not have DTIO hardware support but where reference sequence pruning is performed by the linker. The access cost 906 as shown in FIG. 9 is two instructions for all references more than +/−32 KBs away from the value in the TOC address register 912 and one instruction for all references within +/−32 KBs from the value in the TOC address register 912 (when TOC sequence pruning optimization as described above in reference to FIG. 8 is performed by the linker).

FIG. 9 also shows an access cost 908 associated with a MP that has DTIO hardware support and a 21 bits for specifying a displacement value. The access cost 908 as shown in FIG. 9 is two instructions for all references more than +−1 MB away from the value in the TOC address register 912 and one instruction for all references within +/−1 MB from the value in the TOC address register 912. Thus, the instruction merging by the DTIO in the hardware will occur if the displacement fits within 21 bits and instructions that have displacement values that are over 21 bits will continue execution without a DTIO improved sequence.

FIG. 9 further shows an access cost 910 associated with a MP that has DTIO hardware support and a 26 bits for specifying a displacement value. The access cost 910 as shown in FIG. 9 is two instructions for all references more than +/−32 MBs away from the value in the TOC address register 912 and one instruction for all references within +/−32 MBs from the value in the TOC address register 912. Thus, the instruction merging by the DTIO in the hardware will occur if the displacement fits within 26 bits and instructions that have displacement values that are over 26 bits will continue execution without a DTIO improved sequence.

The access costs associated with the different displacement values shown in FIG. 9 are examples and other access costs may be used depending on the system environment. For example, an access cost for a displacement value outside of a specified range in a positive direction may be less than the access cost for a displacement value outside of the specified range in a negative direction. Additionally, an access cost may increase (e.g., as a step function from 1 instruction to 2 instructions to 3 instructions, etc.) as the displacement value gets farther away from the value in the TOC address register 912. Further, the examples shown in FIG. 9 assume that a signed displacement is used. It is also possible for an unsigned displacement to be used with different access costs depending on factors such as closeness to a TOC based address.

Figure 10:
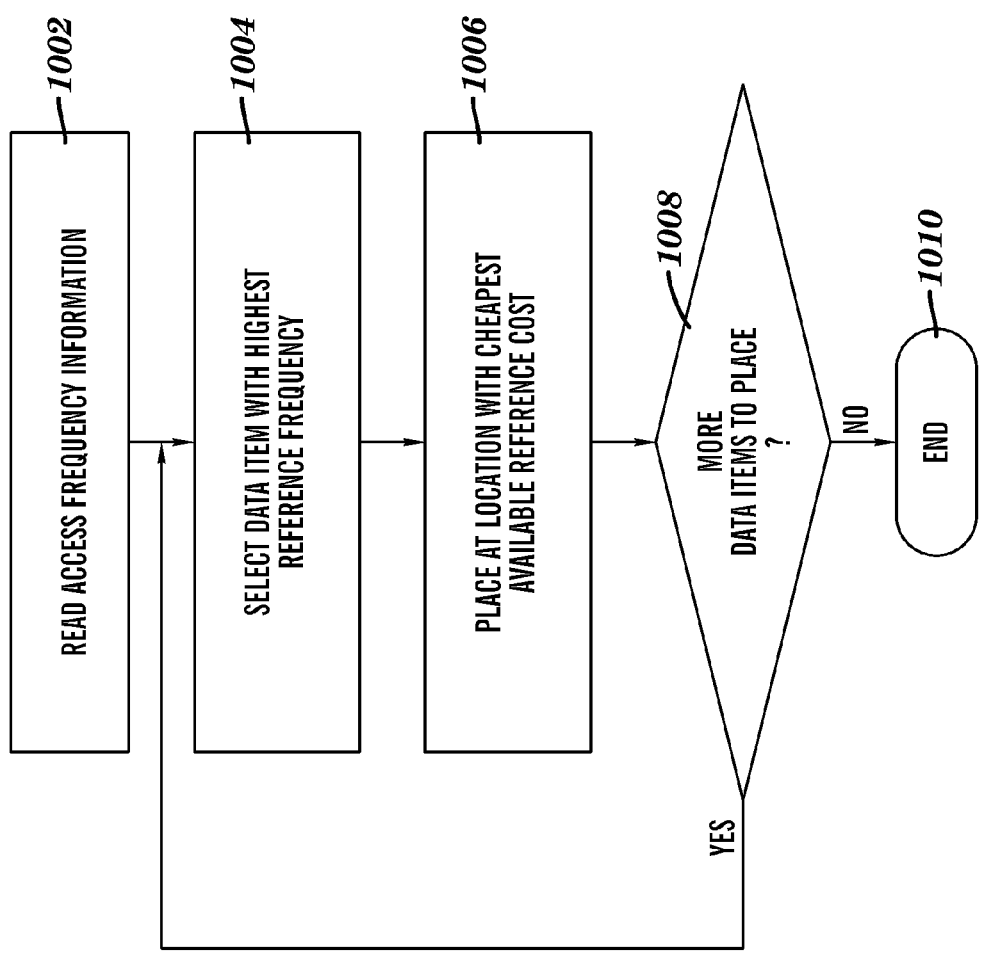
FIG. 10 illustrates a flow diagram of a reference code optimization process performed by a linker to perform reference frequency based TOC reference packing in accordance with an embodiment of the present invention.

FIG. 10 illustrates a flow diagram of a reference code optimization process performed by a linker to perform reference frequency based TOC (or GOT) reference packing in accordance with an embodiment of the present invention. In an embodiment, the process shown in FIG. 10 is implemented by the enhanced linker 80. As shown in FIG. 10 the linker uses reference frequency information associated with the items (e.g., addresses or data) to place the most frequently used reference into regions with the lowest cost (e.g., closest to the value in the TOC address register 912). At block 1002, the linker reads access frequency information. The read frequency information may be based on profile information or it may be synthetically generated based, for example, loop nesting. Another alternative is for the read frequency information to be user specified. At block 1004 of FIG. 10, the item with the highest reference frequency is selected, and at block 106 this item is placed at a location in the TOC with the cheapest available cost. At block 1008, it is determined if there are more data items (e.g., variables) to be placed. If there are more data items to be placed, then processing continues at block 1004. If there are not more data items to be placed, then processing ends at block 1010.

Those skilled in the art will understand that cost metrics other than frequency (e.g., trading off object size and reference frequency) may be used in conjunction with the teachings of this embodiment.

Figure 11:
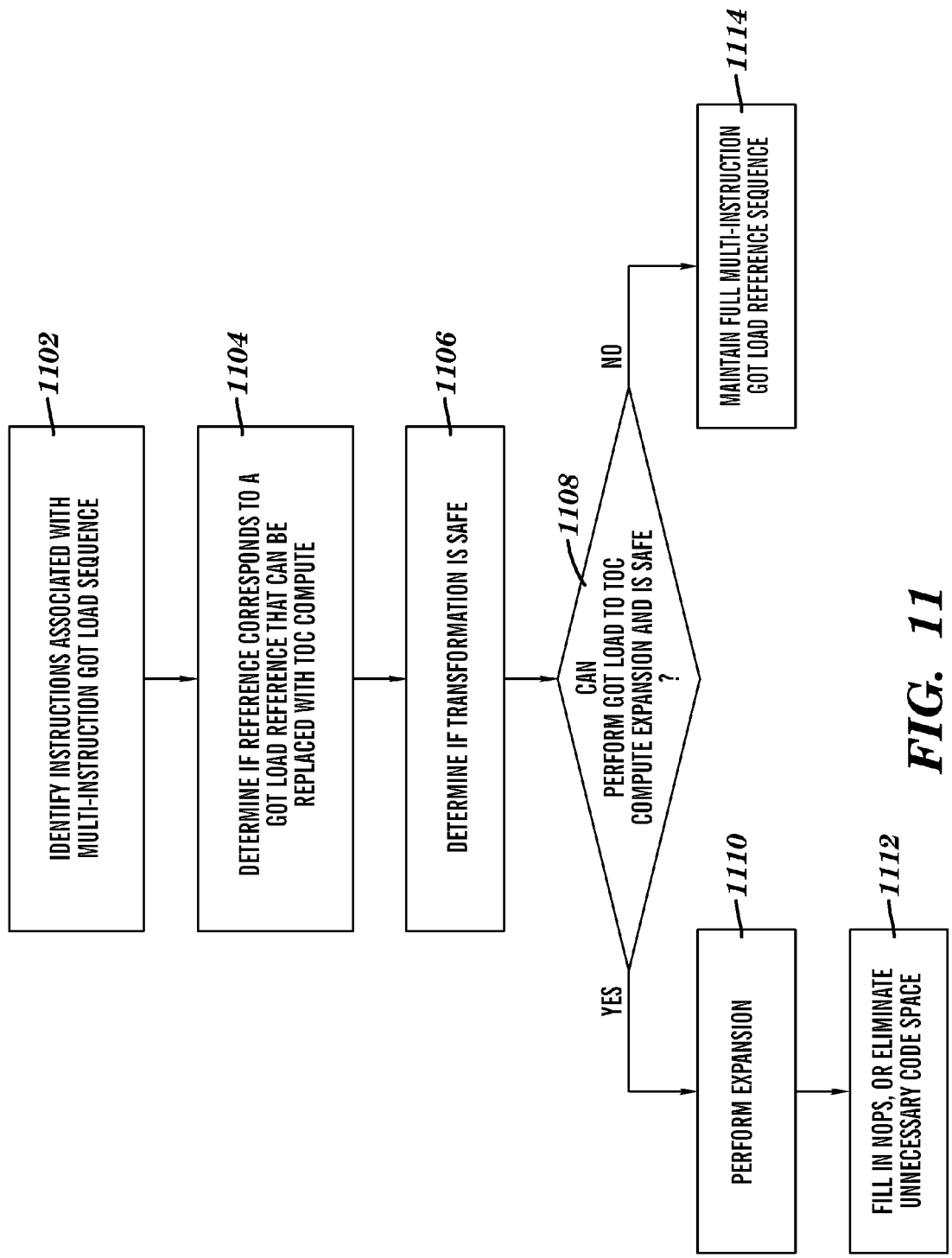
FIG. 11 illustrates a flow diagram of a reference code optimization process performed by a linker to perform a GOT load to TOC compute expansion in accordance with an embodiment of the present invention.

FIG. 11 illustrates a flow diagram of a reference code optimization process performed by a linker to perform a GOT load to TOC compute expansion in accordance with an embodiment of the present invention. In an embodiment, the process shown in FIG. 11 is implemented by the enhanced linker 80. As shown in FIG. 11, if the linker discovers references to variables that are non-local (i.e., shared), but the variable turns out to be created in the local module (e.g., the main module), the linker will optimize the code.

At block 1102 of FIG. 11, the linker identifies instructions associated with a multi-instruction GOT load sequence. The identifying may be performed by looking for dependent instructions that match the multi-instruction TOC reference or by having an object code format that explicitly identifies such sequences. At block 1104, the linker determines if the reference corresponds to a GOT load reference that can be replaced with a TOC compute. This may be determined by the linker linking a main module with a reference to a local variable in the main module. At block 1106, the linker determines if transformation is "safe" by, for example, testing whether the TOC reference is within a defined range of the address reference table base. The range, for example, may correspond to one of a number of displacement bits that can be used to perform a TOC data address computation, or to the number of instructions that may be used to perform the TOC data address computation. An example scenario is where an instruction sequence for loading a GOT can only be replaced with a sequence computing the TOC entry of a similar length (or of a smaller length, in which case the sequence length might be equalized to same length replacement by inserting NOP instructions). This scenario is quite common, since commonly used contemporary linkers are not able to make large modifications to the code that require. If the reference corresponds to a GOT load reference that can be replaced with a TOC compute and the transformation is safe, processing flows from block 1108 to block 1110 and the expansion is performed. At block 1112, the eliminated instructions in the code sequence are replaces with NOPs. An alternative to adding NOPs to the code sequence is to eliminate the unnecessary code space if full relocation information is available.

An example of this type of code sequence that would be determined at block 1104 to correspond to a GOT load reference that can be replaced with a TOC compute follows.

```
addis reg,R2,label@got@h
ld reg,label@got@l(reg)
```

The linker replaces the above code sequence with the following code sequence, at block 1110 of FIG. 11.

```
addis reg,R2,label@toc@h
addi reg,reg,label@toc@l
```

As shown above, a GOT load instruction is converted into a TOC compute instruction. In addition, at block 1112, if the linker discovers that the variable is within 32 KB of the TOC, it will perform pruning as described above and optimize the addis instruction into a NOP instruction as follows.

```
NOP
addi reg,r2,label@toc@l
```

Another example where the linker optimizes code where references to variables that are non-local, but the variable turns out to be created in the local module (the main) follows.

```
addis reg,R2,label@got@h
ld reg,label@got@l(reg)
ld reg, struc_offset(reg)
```

At block 110, the linker replaces the above code sequence with the following code sequence.

```
NOP
addis reg,R2,(label+struc_offset)@toc@h
ld reg,reg,(label+struc_offset)@ toc@l
```

In addition, at block 1112, if the linker discovers that the variable is within 32 KB of the TOC, it will perform pruning as described above and optimize the addis instruction into a NOP instruction as follows.

```
NOP
NOP
ld reg, R2, (label+struc_offsete)@tol@l
```

Embodiments described herein provide performance improvements for both legacy hardware platforms that do not have DTIO capability as well as DTIO enabled hardware platforms. The new code described herein is capable of executing on both legacy and DTIO enabled hardware platforms. New objects may be interspersed with old objects (mix and match objects, no breakage of ABI continuity). For example, legacy objects having old TOC access sequences may be linked with the new objects, while continuing to build a trampoline when the new reference form is not used.

In an embodiment, an old linker/old environment is used to build objects with the new library. This works provided that the new reference high-order bit reference marker is ignored and the new low-order reference bit marker is compatible with the legacy reference marker. In this embodiment, the legacy reference marker is used for low-order bits, and spurious allowance for high-order bits is used. In case of overflow, the new generated code combined with the trampoline leads to a marginally slower (when compared to contemporary solutions) but correct execution. The new libraries may be supplied into legacy environments.

The processes described herein reduces the height of schedule to a height similar to a short (single instruction) displacement sequence in legacy code.

In an embodiment, a PowerPC64 extensible linking format (ELF) ABI uses the terms TOC and GOT. The TOC defined herein is intended to be similar to that defined by the 64-bit PowerOpen ABI. As used herein, the TOC is defined to be the ELF GOT plus small data. The GOT section contains a conventional ELF GOT, and may optionally contain small data area (float constants, etc). The base (TOC) is the address of the GOT+0x8000 and is referenced by the dedicated TOC pointer register "R2". The GOT and the small data area may be intermingled in the GOT section. The section adjacent to the GOT (procedure language table (PLT) and small data) are also accessed via the dedicated TOC pointer.

As used herein, the syntax SYMBOL@toc refers to the value (SYMBOL−base (TOC)). This provides the address of the variable whose name is SYMBOL, as an offset from the TOC base. The syntaxes SYMBOL@toc@ha, SYMBOL@got@h, and SYMBOL@toc@l refer to the high adjusted, high and low parts of the TOC offset.

The syntax SYMBOL@got refers to the value (SYMBOL@got−base (TOC)). This provides the address of the .got entry containing the (64-bit) address variable whose name is SYMBOL, as an offset from the TOC base. The syntaxes SYMBOL@got@ha, SYMBOL@got@h, and SYMBOL@got@l refer to the high adjusted, high, and low parts of the GOT offset.

Specific code examples have been used herein to illustrate various optimizations that may be performed by the enhance compiler 70, enhanced linker 80, and DTIO hardware. These examples are not intended to limit embodiments of the present invention and those skilled in the art will appreciate that other code sequences may be utilized to perform the processing described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claims is:

1. A method comprising:
reading, by a computer, an object file comprising a plurality of code sequences;
identifying a code sequence in the object file that specifies an offset from e base address, the offset from the base address corresponding to an offset location in a memory configured for storing one of an address of a variable and data, the identified code sequence comprising a plurality of instructions and configured to perform one of a memory reference function and a memory address computation function;
determining that the offset location is within a specified distance of the base address;
verifying that a replacement of the identified code sequence with a replacement code sequence will not alter program semantics;
replacing the identified code sequence in the object file with the replacement code sequence, the replacement code sequence including a no-operation (NOP) instruction or having fewer instructions than the identified code sequence;

generating linked executable code based on the object file; and emitting the linked executable code.

2. The method of claim 1, wherein the base address corresponds to a variable address reference table, and an address of a variable having a high access frequency is stored in an offset location that is closer to the base address of the variable address reference table than an offset location storing an address of a variable having a low access frequency, the low access frequency less than the high access frequency.

3. The method of claim 1, wherein the plurality of instructions are sequential instructions.

4. The method of claim 1, wherein the verifying that a replacement of the identified code sequence with a replacement code sequence will not alter program semantics includes checking that the offset location corresponding to the offset from the base address specified in the identified code sequence is not configured to be written with a new value prior to a last instruction in the identified code sequence.

5. The method of claim 1, wherein the base address corresponds to a global offset table (GOT), one of the plurality of instructions in the identified code sequence includes a GOT load reference instruction, and the replacement code sequence further includes a table of contents (TOC) compute instruction.

6. A method comprising:

reading, by a computer, an object file comprising a plurality of code sequences that include symbols as placeholders for offset locations in a reference table, each offset location configured for storing one of an address of a variable and data;

receiving access frequency information associated with the code sequences;

ordering the plurality of code sequences by access frequency;

receiving cost information associated with the offset locations;

performing for each symbol in the code sequences, starting with a code sequence with the highest access frequency:

assigning an offset location in the reference table to the symbol, the offset location having a lowest cost of offset locations that have not previously been assigned to another symbol; and replacing the symbol in the object file with the offset location; and emitting the object file.

7. The method of claim 6, further comprising:

identifying a code sequence in the object file that specifies an offset location in the reference table, the identified code sequence comprising a plurality of instructions and configured to perform one of a memory reference function and a memory address computation function;

determining that the offset location is within a specified distance of a base address of the reference table;

verifying that a replacement of the identified code sequence with a replacement code sequence will not alter program semantics;

replacing the identified code sequence in the object file with the replacement code sequence, the replacement code sequence including a no-operation (NOP) instruction or having fewer instructions than the identified code sequence;

generating linked executable code based on the object file; and emitting the linked executable code.

* * * * *